US011969095B2

(12) United States Patent
Liu et al.

(10) Patent No.: US 11,969,095 B2
(45) Date of Patent: Apr. 30, 2024

(54) LIFT CHAIR WITH HORIZONTALLY MAINTAINED ARMRESTS

(71) Applicant: HHC CHANGZHOU CORPORATION, Changzhou (CN)

(72) Inventors: Chih Hsiung Liu, Benoni (ZA); Zhi Liang Gao, Xiaji Town (CN)

(73) Assignee: MOTOMOTION CHINA CORPORATION, Changzhou (CN)

( * ) Notice: Subject to any disclaimer, the term of this patent is extended or adjusted under 35 U.S.C. 154(b) by 0 days.

(21) Appl. No.: 17/730,335

(22) Filed: Apr. 27, 2022

(65) Prior Publication Data

US 2023/0210263 A1 Jul. 6, 2023

(30) Foreign Application Priority Data

Dec. 30, 2021 (CN) ......................... 202123370049.0

(51) Int. Cl.

*A61G 5/14* (2006.01)
*A47C 1/035* (2006.01)
*A47C 1/0355* (2013.01)
*A47C 3/20* (2006.01)

(52) U.S. Cl.

CPC ................ *A47C 1/035* (2013.01); *A47C 3/20* (2013.01); *A61G 5/14* (2013.01)

(58) Field of Classification Search

CPC .................................. A61G 5/14; A47C 1/035
See application file for complete search history.

(56) References Cited

U.S. PATENT DOCUMENTS 4,850,645 A * 7/1989 Crockett .................. A61G 5/14
297/DIG. 10
4,946,222 A * 8/1990 Matson ................ A47C 1/0345
297/DIG. 10
5,219,204 A * 6/1993 Bathrick .................. A61G 5/14
297/DIG. 10
5,294,179 A * 3/1994 Rudes ...................... A61G 5/14
297/DIG. 10

(Continued)

*Primary Examiner* — Rodney B White
(74) *Attorney, Agent, or Firm* — LAW OFFICES OF STEVEN W. WEINRIEB

(57) ABSTRACT

A powered lift chair comprises a frame, a backrest, left and right armrests, a seat, a footrest, and a pair of linear actuator mechanisms. A first one of the pair of linear actuator mechanisms is utilized to control the backrest of the chair, while the second one of the pair of linear actuator mechanisms is utilized to move the frame of the chair between a lowered position and an elevated position, as well as to move the seat of the chair between a substantially horizontal orientation and a tilted orientation such that the forward end portion of the seat is tilted downwardly while the rearward end portion of the seat is tilted upwardly, all while the left and right armrests are fixed in position and disposed within horizontal planes. Such compound movements of the chair and the seat will stably assist a person to be moved from a seated position to a standing position while the person is able to grasp and push downwardly upon the left and right armrests whereby the fixed armrests will effectively provide the person with stable platforms upon which the person can reliably, securely, and safely place his or her hands so as to assist himself or herself to move from the seated position to the standing position.

9 Claims, 9 Drawing Sheets

(56) References Cited

U.S. PATENT DOCUMENTS

| | | | | | |
|---|---|---|---|---|---|
| 6,000,758 | A * | 12/1999 | Schaffner | A47C 1/0345 | 297/DIG. 10 |
| 7,255,397 | B2 * | 8/2007 | Olcheski | A61G 5/14 | 297/DIG. 10 |
| 7,543,885 | B2 * | 6/2009 | Pollard | A47C 1/024 | 297/85 M X |
| 7,575,279 | B2 * | 8/2009 | Robertson | A47C 1/0242 | 297/DIG. 10 |
| 8,308,228 | B2 * | 11/2012 | Lawson | A47C 1/029 | 297/331 |
| 8,398,165 | B2 * | 3/2013 | Lawson | A47C 3/027 | 297/259.2 |
| 8,419,122 | B2 * | 4/2013 | Lawson | A47C 1/035 | 297/259.2 |
| 9,010,851 | B2 * | 4/2015 | LaPointe | A47C 1/03205 | 297/85 M |
| 9,050,231 | B2 * | 6/2015 | Masters | A61G 5/14 | |
| 9,408,466 | B2 * | 8/2016 | Flamme | A47C 7/56 | |
| 9,468,295 | B2 * | 10/2016 | Lawson | A47C 1/0355 | |
| 9,782,005 | B2 * | 10/2017 | Paul | A47C 1/0342 | |
| 9,931,256 | B2 * | 4/2018 | White | A61G 5/14 | |
| 10,004,334 | B2 * | 6/2018 | Robertson | A47C 1/029 | |
| 10,245,195 | B2 * | 4/2019 | Feldman | A47C 7/506 | |
| 10,258,158 | B2 * | 4/2019 | Fei | A61G 5/04 | |
| 10,485,719 | B2 * | 11/2019 | Murphy | A47C 1/0242 | |
| 10,507,146 | B1 * | 12/2019 | Alhajery | A61G 5/14 | |
| 10,524,574 | B2 * | 1/2020 | LaPointe | A47C 1/0352 | |
| 10,595,637 | B2 * | 3/2020 | Paul | A47C 7/506 | |
| 10,986,923 | B2 * | 4/2021 | Kachirski | A47C 1/0355 | |
| 11,006,753 | B2 * | 5/2021 | Carrera | A47C 1/0242 | |
| 11,044,996 | B2 * | 6/2021 | Paul | A61G 5/006 | |
| 11,109,681 | B2 * | 9/2021 | Zhang | A61G 5/14 | |
| 11,246,420 | B1 * | 2/2022 | Marquez | A47C 7/462 | |
| 11,357,331 | B1 * | 6/2022 | Lake | A47C 7/185 | |
| 11,564,497 | B2 * | 1/2023 | Sha | A47C 1/03211 | |
| 2011/0248530 | A1 * | 10/2011 | Sartisohn | A47C 1/034 | 297/83 |

* cited by examiner

LIFT CHAIR WITH HORIZONTALLY MAINTAINED ARMRESTS

FIELD OF THE INVENTION

The present invention relates to furniture, and more particularly to a powered recliner-lift chair wherein, when the chair is elevated and tilted so as to assist a person, who has been sitting in the chair, to move to a standing position, the armrests of the chair will always be maintained within a horizontal plane, as opposed to be inclined downwardly, so as to provide the person with adequate and proper support and thereby positively assist the person to attain the standing position in a safe manner.

BACKGROUND OF THE INVENTION

With the growing popularity of powered chairs, sofas, or love seats, wherein the various components or sections of the powered chairs, sofas, or love seats can be moved to a multiplicity of positions such that a person, seated within the powered chair, sofa, or love seat, is permitted to attain various positions for various degrees of comfort depending upon a particular avocation the person is engaged in, such as, for example, watching television, reading, napping, and the like, more and more consumers are electing to incorporate powered chairs, sofas, or love seats within their homes or offices. As has been noted, different components or sections of such powered chairs, sofas, or love seats can attain different positions, attitudes, or orientations relative to the main frame of the powered chair, sofa, or love seat. For example, a footrest section or component of the powered chair, sofa, or love seat can be moved between an extended or elevated position and a retracted or lowered position. Similarly, the backrest portion of the powered chair, sofa, or love seat can be moved between a fully upright position and a fully inclined position. Still further, the seat section of the powered chair, sofa, or love seat can be moved between a normal, horizontally oriented seated position, and an inclined position wherein the rear portion of the seat section is elevated while the forward portion of the seat section is lowered. This orientation of the seat section of the powered chair, sofa, or love seat is often used in order to assist persons, particularly the elderly, to move from a seated position to a standing position.

Unfortunately, in conventional powered chairs, sofas, or love seats which have a structural system incorporated therein which would facilitate or assist a person to move from the seated position to a standing position, when the seat section of the powered chair, sofa, or love seat is inclined in the aforenoted manner so as to assist the person to move from the seated position to the standing position, the pair of armrests, disposed upon oppositely disposed sides of the powered chair, sofa, or love seat, move with the seat section of the powered chair, sofa, or love seat, such that the pair of oppositely disposed armrests are likewise disposed in a forwardly, downwardly inclined orientation. Accordingly, the forwardly and downwardly inclined armrests of the powered chair, sofa or love seat, cannot provide adequate support to the person attempting to move from the seated position to the standing position because the armrests have effectively been lowered to positions at which the person's hands cannot easily, comfortably, and securely grasp them so as to in fact help the person move from the seated position to the standing position. This not only renders the process difficult but dangerous in view of the fact that the person, particularly an elderly person, can slip, become unbalanced, and fall, possibly incurring an injury.

A need therefore exists in the art for a new and improved powered chair, sofa, or love seat. An additional need exists in the art for a new and improved powered chair, sofa, or love seat wherein the powered chair, sofa, or love seat can be raised from a lowered position to an elevated position so as to assist people in moving from a seated position to a standing position. Another need exists in the art for a new and improved powered chair, sofa, or love seat wherein the powered chair, sofa, or love seat can be raised from a lowered position to an elevated position, so as to assist people in moving from a seated position to a standing position, wherein the seat portion of the powered chair, sofa, or love seat is tilted so that the rear section of the seat portion is elevated while the forward section of the seat portion is lowered, however, the oppositely disposed arm rest portions of the powered chair, sofa, or love seat remain horizontal throughout the transition from the lowered position to the elevated position.

Still another need exists in the art for a new and improved powered chair, sofa, or love seat wherein the powered chair, sofa, or love seat can be raised from a lowered position to an elevated position, so as to assist people in moving from a seated position to a standing position, wherein the seat portion of the powered chair, sofa, or love seat is tilted so that the rear section of the seat portion is elevated while the forward section of the seat portion is lowered, however, the oppositely disposed arm rest portions of the powered chair, sofa, or love seat remain horizontal throughout the transition from the lowered position to the elevated position such that the oppositely disposed arm rest portions of the powered chair, sofa, or love seat effectively provide a stable platform for the person being elevated from the seating position to the standing position. Yet another need exists in the art for a new and improved powered chair, sofa, or love seat wherein the powered chair, sofa, or love seat can be raised from a lowered position to an elevated position, so as to assist people in moving from a seated position to a standing position, wherein the seat portion of the powered chair, sofa, or love seat is tilted so that the rear section of the seat portion is elevated while the forward section of the seat portion is lowered, however, the oppositely disposed arm rest portions of the powered chair, sofa, or love seat remain horizontal throughout the transition from the lowered position to the elevated position such that the oppositely disposed arm rest portions of the powered chair, sofa, or love seat effectively provide a stable platform for the person being elevated from the seating position to the standing position whereby the stability supplied to the person being elevated from the seating position to the standing position will prevent the person from slipping, becoming unbalanced, or falling. Yet still another need exists in the art for a new and improved powered chair, sofa, or love seat wherein the powered chair, sofa, or love seat can be raised from a lowered position to an elevated position, so as to assist people in moving from a seated position to a standing position, wherein the seat portion of the powered chair, sofa, or love seat is tilted so that the rear section of the seat portion is elevated while the forward section of the seat portion is lowered, however, the oppositely disposed arm rest portions of the powered chair, sofa, or love seat remain horizontal throughout the transition from the lowered position to the elevated position such that the oppositely disposed arm rest portions of the powered chair, sofa, or love seat effectively provide a stable platform for the person being elevated from the seating position to the standing position whereby the stability supplied to the person being elevated from the seating position to the standing position will prevent the person from slipping, becoming unbalanced, or falling, and thereby possibly incurring a serious injury.

OVERALL OBJECTIVES OF THE INVENTION

Therefore, an overall objective of the present invention is to provide a new and improved powered chair, sofa, or love seat. An additional overall objective of the present invention is to provide a new and improved powered chair, sofa, or love seat wherein the powered chair, sofa, or love seat can be raised from a lowered position to an elevated position so as to assist people in moving from a seated position to a standing position. Another overall objective of the present invention is to provide a new and improved powered chair, sofa, or love seat wherein the powered chair, sofa, or love seat can be raised from a lowered position to an elevated position, so as to assist people in moving from a seated position to a standing position, wherein the seat portion of the powered chair, sofa, or love seat is tilted so that the rear section of the seat portion is elevated while the forward section of the seat portion is lowered, however, the oppositely disposed arm rest portions of the powered chair, sofa, or love seat remain horizontal throughout the transition from the lowered position to the elevated position.

Still another overall objective of the present invention is to provide a new and improved powered chair, sofa, or love seat wherein the powered chair, sofa, or love seat can be raised from a lowered position to an elevated position, so as to assist people in moving from a seated position to a standing position, wherein the seat portion of the powered chair, sofa, or love seat is tilted so that the rear section of the seat portion is elevated while the forward section of the seat portion is lowered, however, the oppositely disposed arm rest portions of the powered chair, sofa, or love seat remain horizontal throughout the transition from the lowered position to the elevated position such that the oppositely disposed arm rest portions of the powered chair, sofa, or love seat effectively provide a stable platform for the person being elevated from the seating position to the standing position. Yet another overall objective of the present invention is to provide a new and improved powered chair, sofa, or love seat wherein the powered chair, sofa, or love seat can be raised from a lowered position to an elevated position, so as to assist people in moving from a seated position to a standing position, wherein the seat portion of the powered chair, sofa, or love seat is tilted so that the rear section of the seat portion is elevated while the forward section of the seat portion is lowered, however, the oppositely disposed arm rest portions of the powered chair, sofa, or love seat remain horizontal throughout the transition from the lowered position to the elevated position such that the oppositely disposed arm rest portions of the powered chair, sofa, or love seat effectively provide a stable platform for the person being elevated from the seating position to the standing position whereby the stability supplied to the person being elevated from the seating position to the standing position will prevent the person from slipping, becoming unbalanced, or falling. Yet still another overall objective of the present invention is to provide a new and improved powered chair, sofa, or love seat wherein the powered chair, sofa, or love seat can be raised from a lowered position to an elevated position, so as to assist people in moving from a seated position to a standing position, wherein the seat portion of the powered chair, sofa, or love seat is tilted so that the rear section of the seat portion is elevated while the forward section of the seat portion is lowered, however, the oppositely disposed arm rest portions of the powered chair, sofa, or love seat remain horizontal throughout the transition from the lowered position to the elevated position such that the oppositely disposed arm rest portions of the powered chair, sofa, or love seat effectively provide a stable platform for the person being elevated from the seating position to the standing position whereby the stability supplied to the person being elevated from the seating position to the standing position will prevent the person from slipping, becoming unbalanced, or falling, and thereby possibly incurring a serious injury.

SUMMARY OF THE INVENTION

In accordance with the principles and teachings of the present invention, there is provided a new and improved powered chair, sofa, or love seat wherein the new and improved chair, for the purposes of this disclosure, although the structural components of the chair are applicable to a sofa or love seat, is seen to comprise a frame, a backrest, left and right armrests, a seat, a footrest, and a pair of linear actuator mechanisms. A first one of the pair of linear actuator mechanisms is utilized to control the backrest of the chair, while the second one of the pair of linear actuator mechanisms is utilized to move the frame of the chair between a lowered position and an elevated position, as well as to move the seat of the chair between a substantially horizontal orientation and a tilted orientation. More particularly, the left and right armrests of the chair are fixedly mounted upon the frame of the chair so as to always remain fixed in position, within substantially horizontal planes and with respect to the frame of the chair, regardless of the movement of the chair between the lowered position and the elevated position, and regardless of the movement of the seat of the chair which is adapted to be moved, relative to the frame of the chair and the left and right armrests of the chair, by means of the second one of the pair of powered mechanisms so as to be vertically elevated along with the frame of the chair as well as to be tilted downwardly with respect to the frame of the chair and with respect to the left and right armrests of the chair such that the forward end portion of the seat is tilted downwardly while the rearward end portion of the seat is tilted upwardly.

Such compound movements of the chair and the seat will assist a person to be moved from a seated position to a standing position. More particularly, as a result of the left and right armrests of the chair being fixedly mounted upon the frame of the chair, and therefore not having their dispositions or orientations altered or changed when the chair is moved or transitioned between the lowered position and the elevated position, it can be readily appreciated that even when the frame of the chair is elevated, and even when the seat of the chair is tilted in the aforenoted manner, whereby such movements of the chair and the seat will assist a person, seated within the chair, to be moved from a seated position to a standing position, the left and right armrests will always be disposed within substantially horizontal planes. In this manner, the left and right armrests will effectively enable the person, seated within the chair, to comfortably and securely grasp the left and right armrests, and to push downwardly upon such left and right armrests, whereby the fixed armrests will effectively provide the person with stable platforms upon which the person can reliably, securely, and safely place his or her hands so as to assist himself or herself to move from the seated position to the standing position.

BRIEF DESCRIPTIONS OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 1 is a schematic, side elevational view of the new and improved lift chair which has been developed in accordance with the principles and teachings of the present invention, wherein one side arm section of the chair has effectively been removed such that the internal components of the lift chair can be readily seen and appreciated, and wherein the lift chair is shown as being disposed at its lowered position;

Figure 5:
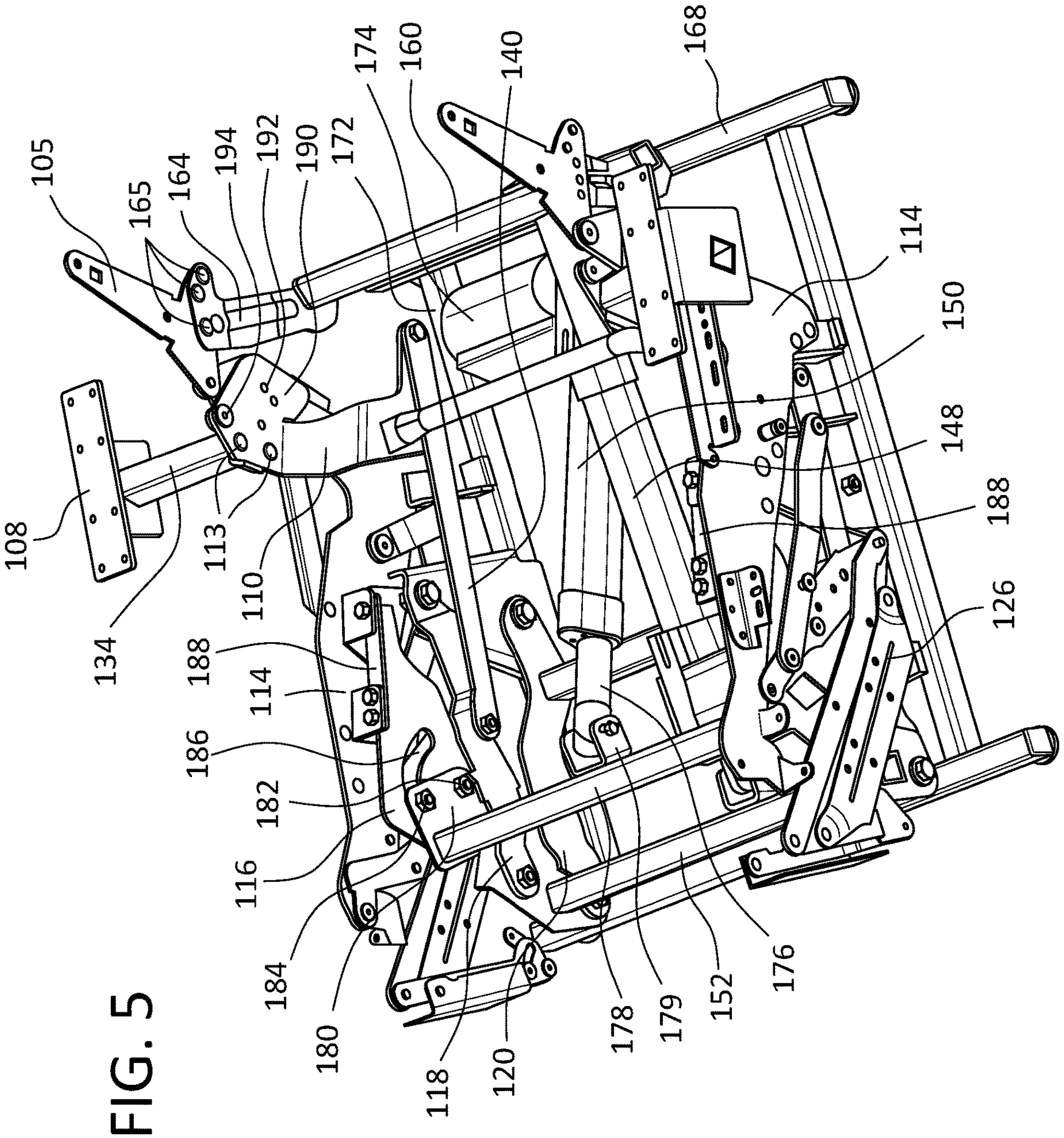
FIG. 5 is a left side, top perspective view of substantially all of the operating mechanisms of the lift chair, as disclosed within FIGS. 1 and 2, showing the various components when the lift chair is disposed at its lowered position.
Figure 6:
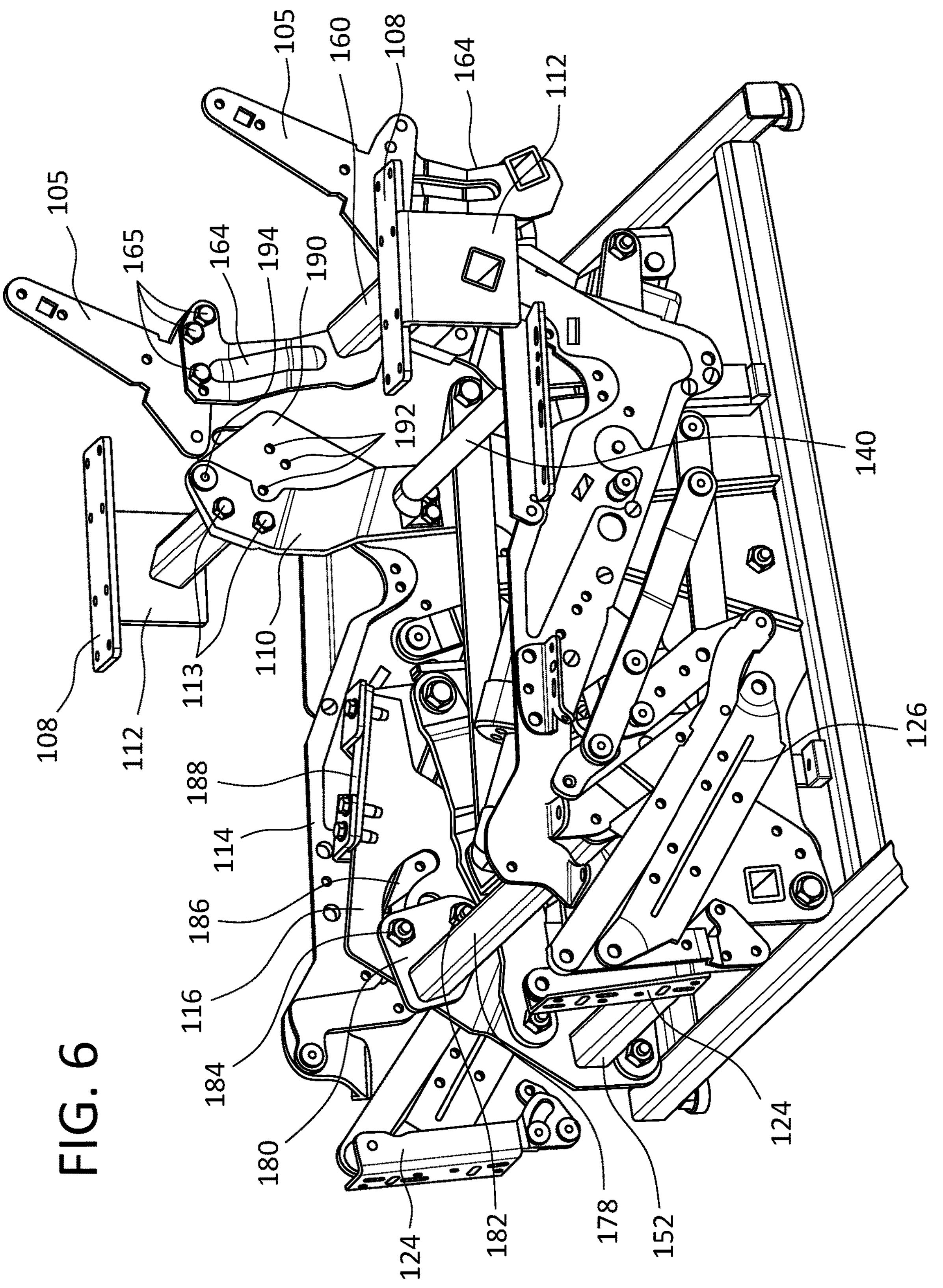
FIG. 6 is a perspective view, similar to that of FIG. 5, but showing the lift chair from a slightly different left side perspective point of view.
Figure 7:
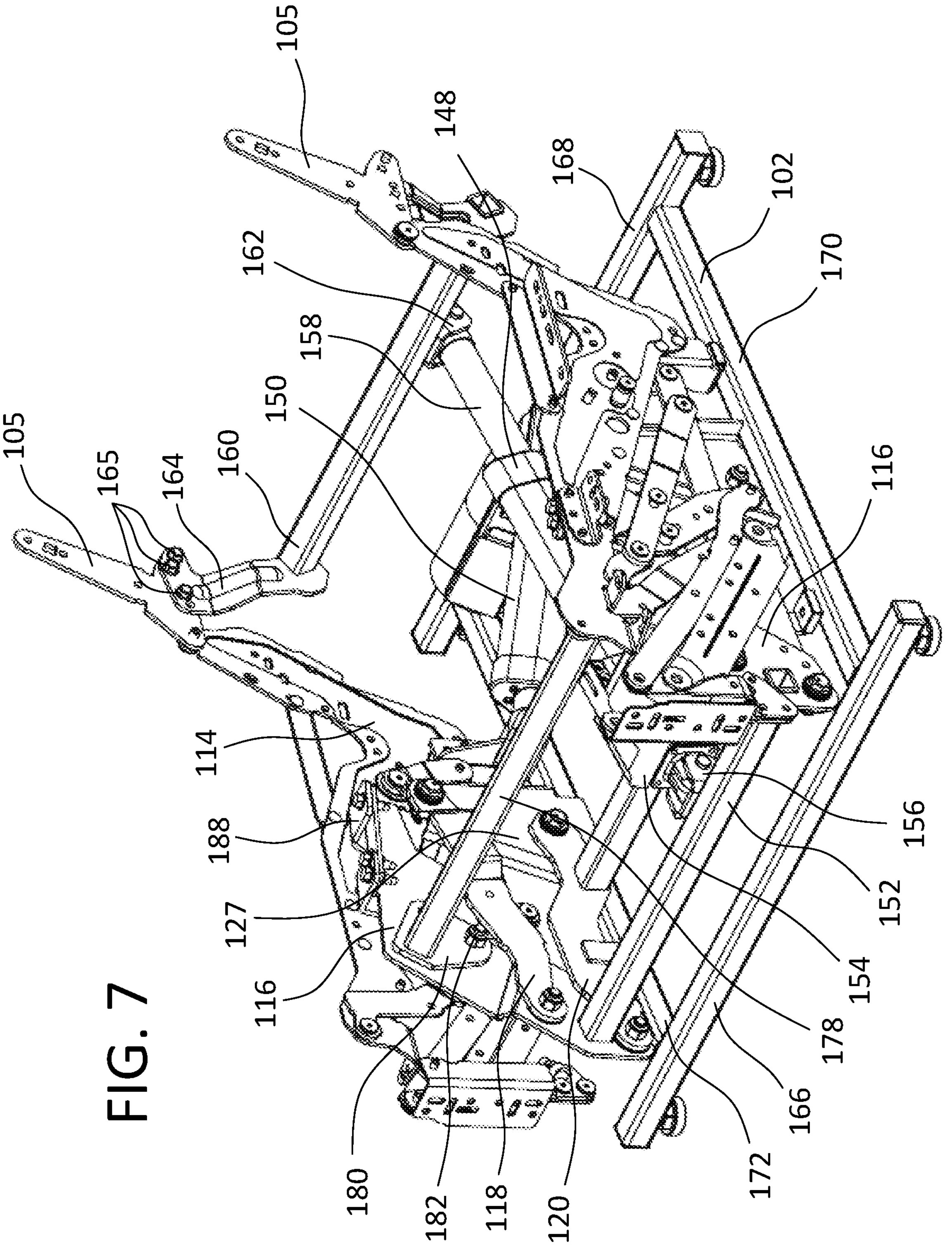
FIG. 7 is a perspective view, similar to those of FIGS. 5 and 6, showing the lift chair from a front, left side perspective point of view so that various components of the lift chair can be better seen and appreciated, and wherein the armrest fixing plates have been removed.
Figure 8:
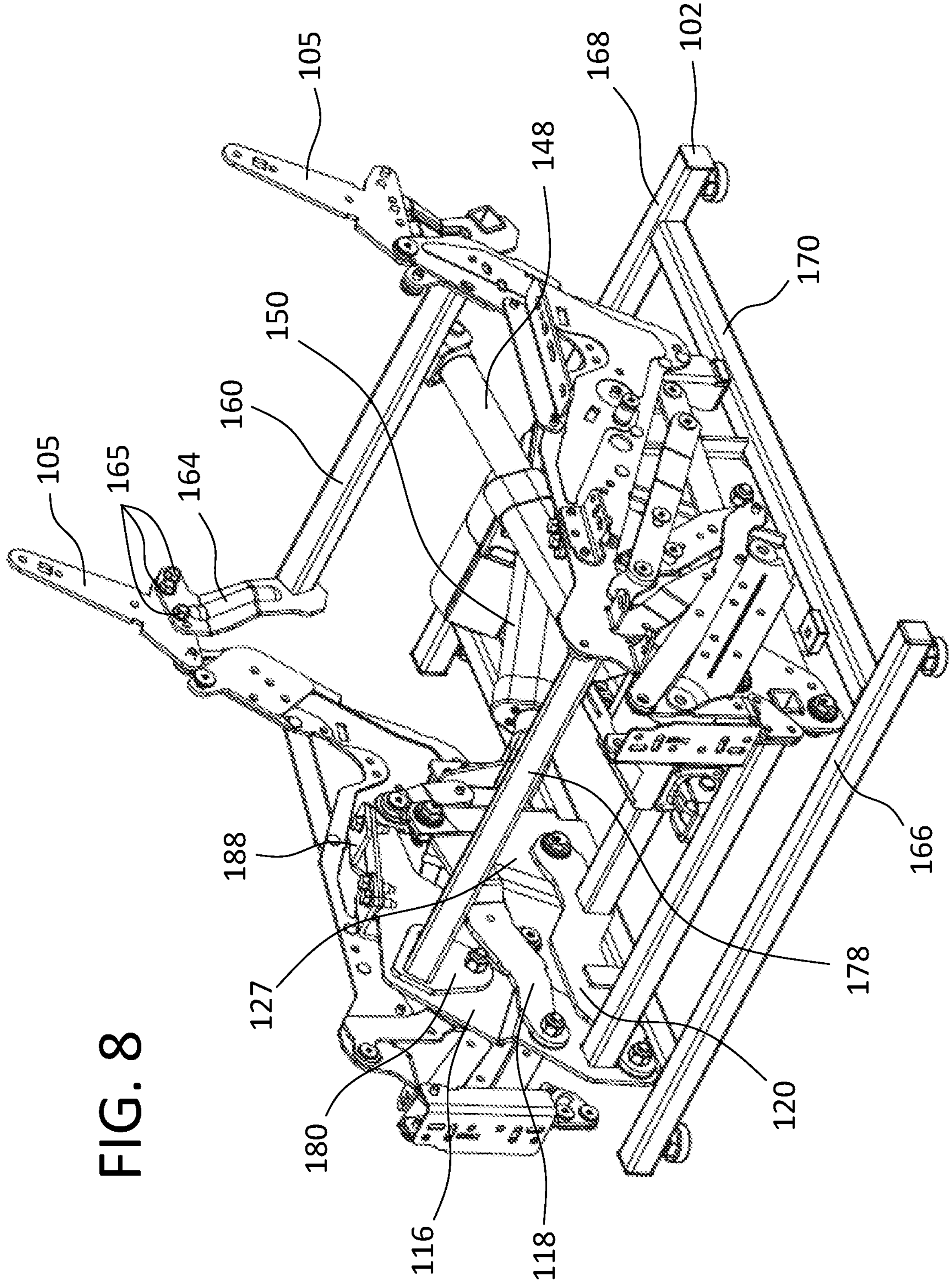
Figure 9:
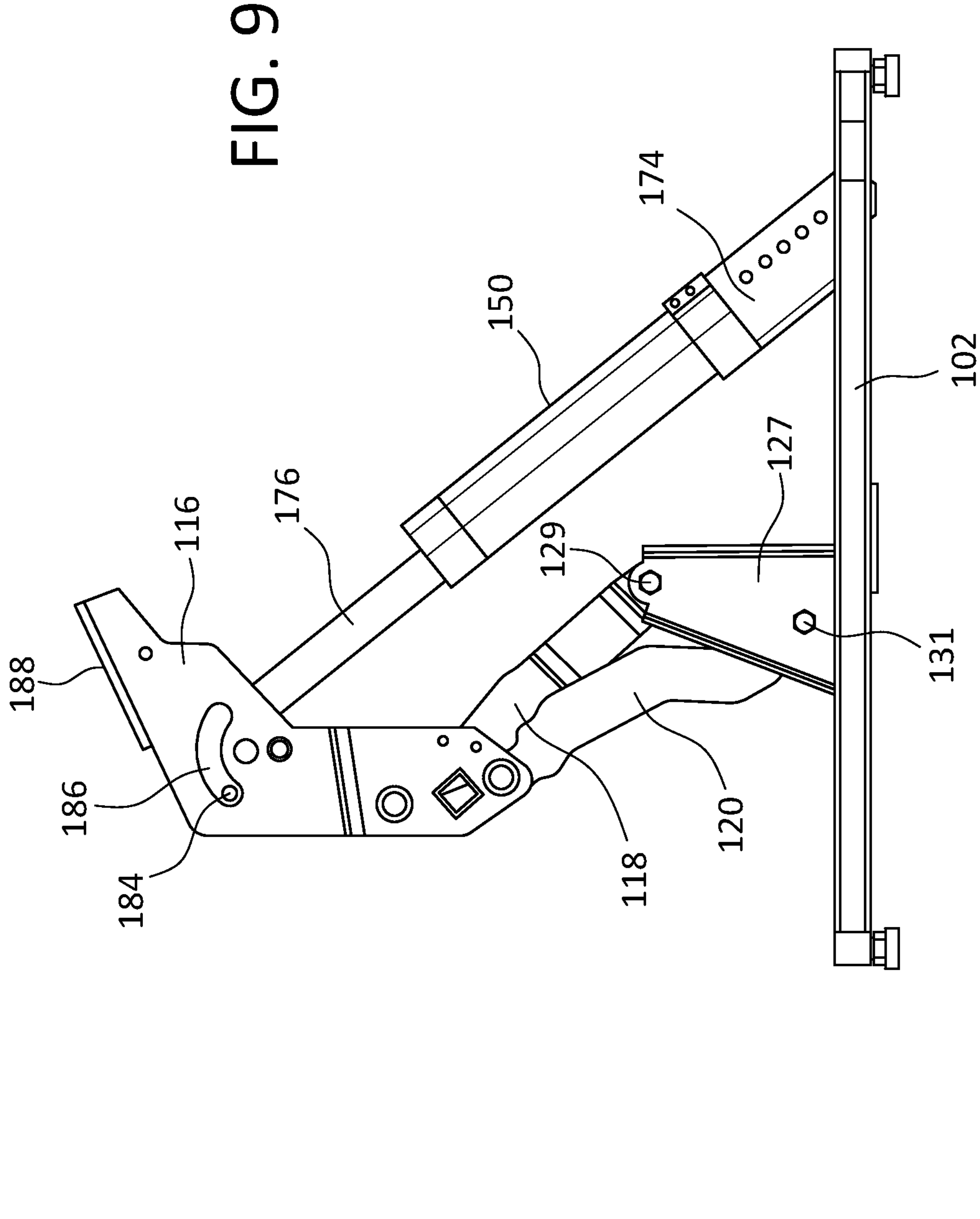

FIG. 8 is a perspective view similar to that of FIG. 7, wherein a connecting plate has been shown, as in FIGS. 5 and 6, for interconnecting each armrest support link to each seat link assembly; and FIG. 9 is a schematic view showing how the linear actuator causes the lift chair to be elevated along with the tilting of the seat portion of the chair such that the forward end of the seat portion of the chair is disposed at a lower elevation than the rear end of the seat portion of the chair.

DETAILED DESCRIPTION OF THE PREFERRED EMBODIMENT

Figure 1:
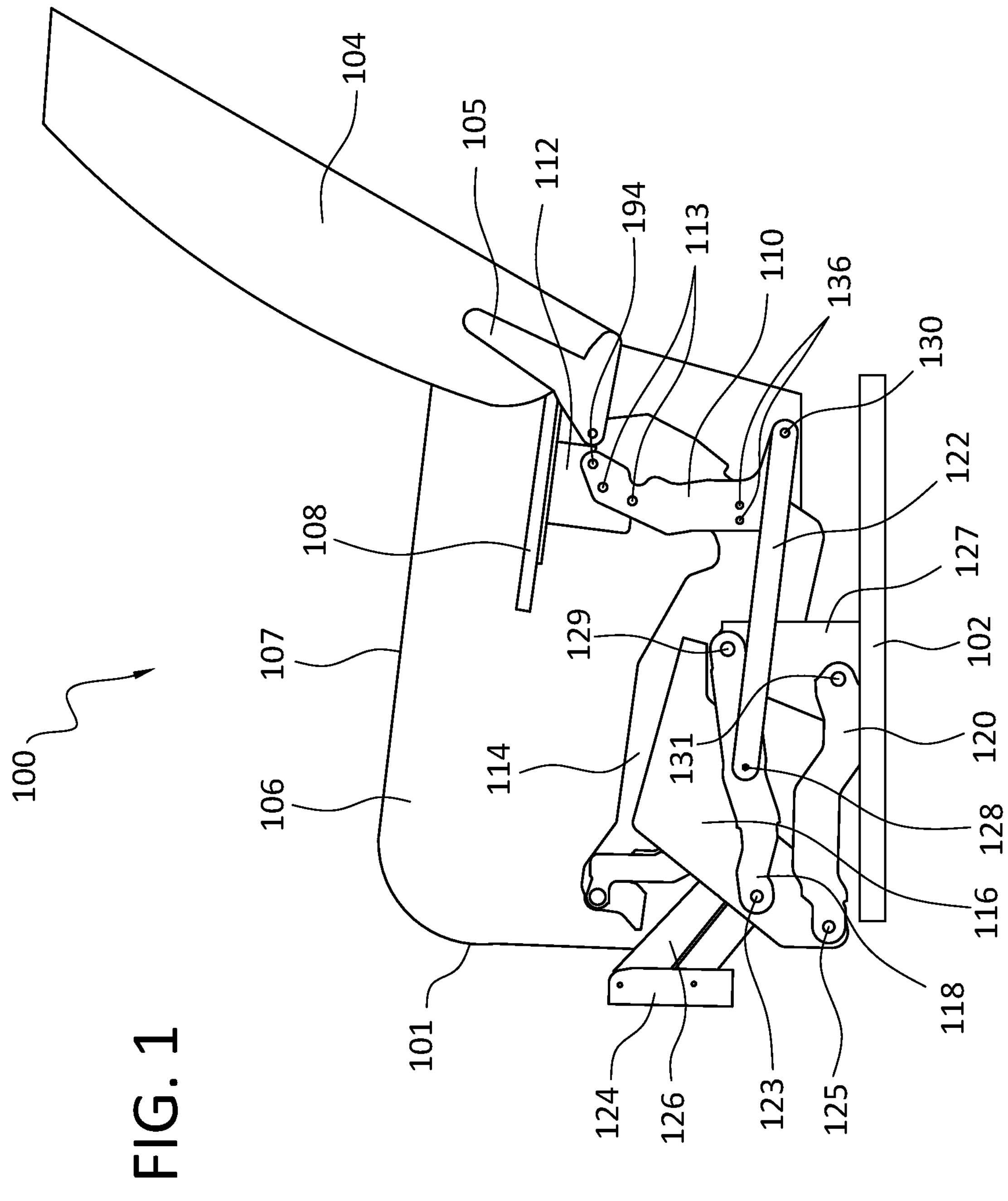
Figure 2:
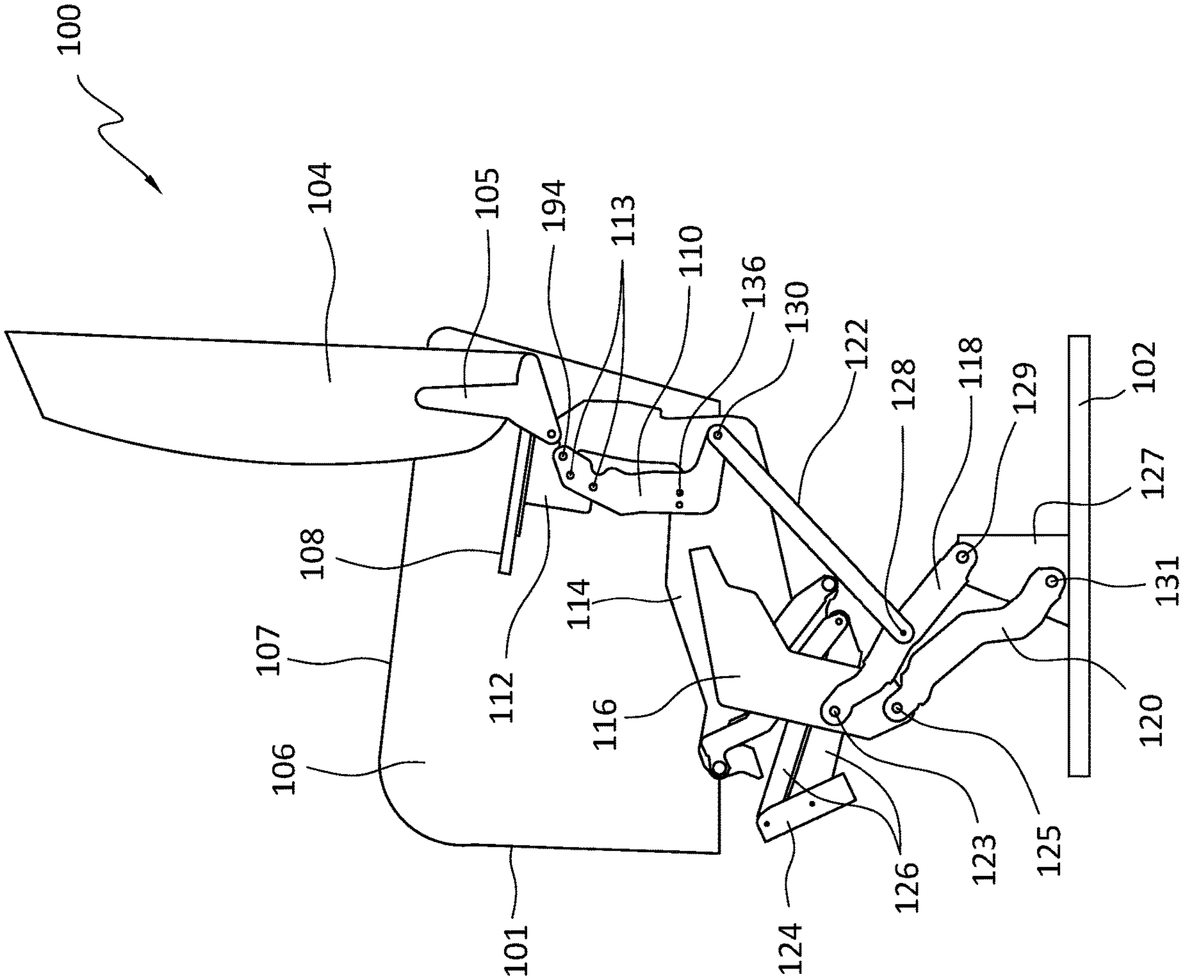
FIG. 2 is a schematic, side elevational view of the lift chair as disclosed within FIG. 1 wherein, however, the lift chair has now been moved to its elevated position.

Having briefly described the new and improved lift chair for the purposes of this disclosure of the present invention, although the principles and teachings of this disclosure can equally be applicable to a sofa or love seat, a detailed description of the new and improved lift chair will now be provided. Therefore, with reference being initially made to FIGS. 1 and 2, the new and improved lift chair, which has been developed in accordance with the teachings and principles of the present invention, is disclosed and is generally indicated by the reference character 100, the new and improved lift chair 100 being disclosed at its lowered position in FIG. 1 and at its elevated position in FIG. 2. More particularly, it is seen that the lift chair 100 comprises a frame 101, a base 102, a backrest 104, a pair of backrest actuating links 105, only one of which is shown in FIGS. 1 and 2, and left and right armrest frameworks 106, only one of which is also shown in FIGS. 1 and 2, the left and right armrest frameworks 106 being fixedly secured to the various operative components of the lift chair 100 such that upper surface portions 107 of the left and right armrest frameworks 106 are always disposed within the same orientation with respect to the base 102, that is, they are always disposed within substantially horizontal planes, regardless of whether the lift chair 100 is disposed at its lowered position, at its elevated position, or in transition between the lowered and elevated position.

An armrest fixing plate 108 is operatively associated with each one of left and right armrest frameworks 106 such that each one of the armrest frameworks 106 can be fixedly mounted thereon, an armrest support link 110 is provided for each armrest framework 106, and an armrest mounting plate 112 operatively connects the armrest fixing plate 108 to the armrest support link 110 by means of suitable fasteners 113. The operative components of the lift chair 100 further comprise a pair of oppositely disposed seat link assemblies 114, only one of which is shown in FIGS. 1 and 2, a pair of oppositely disposed seat base brackets 116 respectively connected to the seat link assemblies 114, an upper lift link 118, a lower lift link 120, a straight link 122 interconnecting the upper lift link 118 to the armrest support link 110, left and right footrest mounting brackets 124, only one of which is shown in FIGS. 1 and 2, and left and right footrest actuating link assemblies 126 operatively connected to the footrest mounting brackets 124. It is to be noted that since the footrest mounting brackets 124, and their footrest actuating link assemblies 126, do not really have any significant relevance to the import, basis, or objectives of the present invention, further discussion of the footrest mounting brackets 124, and their footrest actuating link assemblies 126, will not be provided. Lastly, as shown within FIGS. 1 and 2, a first end of the straight link 122 is pivotally connected to the upper lift link 118 as at 128, while the second opposite end of the straight link 122 is pivotally connected to a lower end portion of the armrest support ink 110 as at 130. In turn, it is seen that the left end portions of the upper and lower lift links 118,120 are pivotally connected to the seat base bracket 116 as at 123,125, while the right end portions of the upper and lower lift links 118,120 are respectively pivotally connected to upper and lower end portions of a base mounting bracket 127 as at 129,131.

Figure 3:
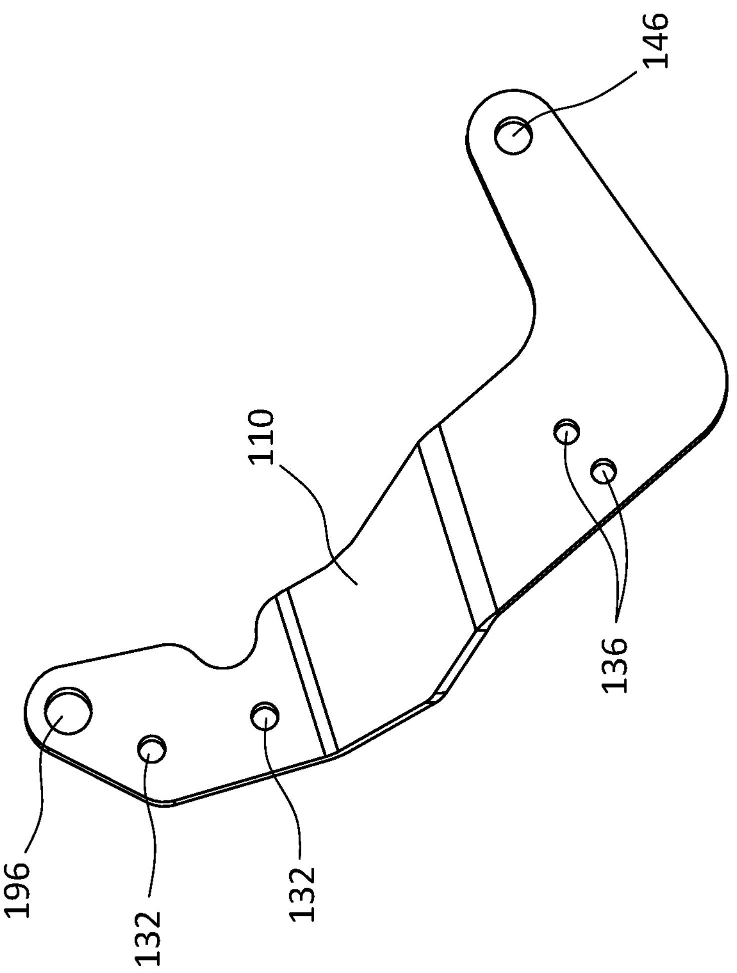
FIG. 3 is a perspective view showing one of the armrest support links.
Figure 4:
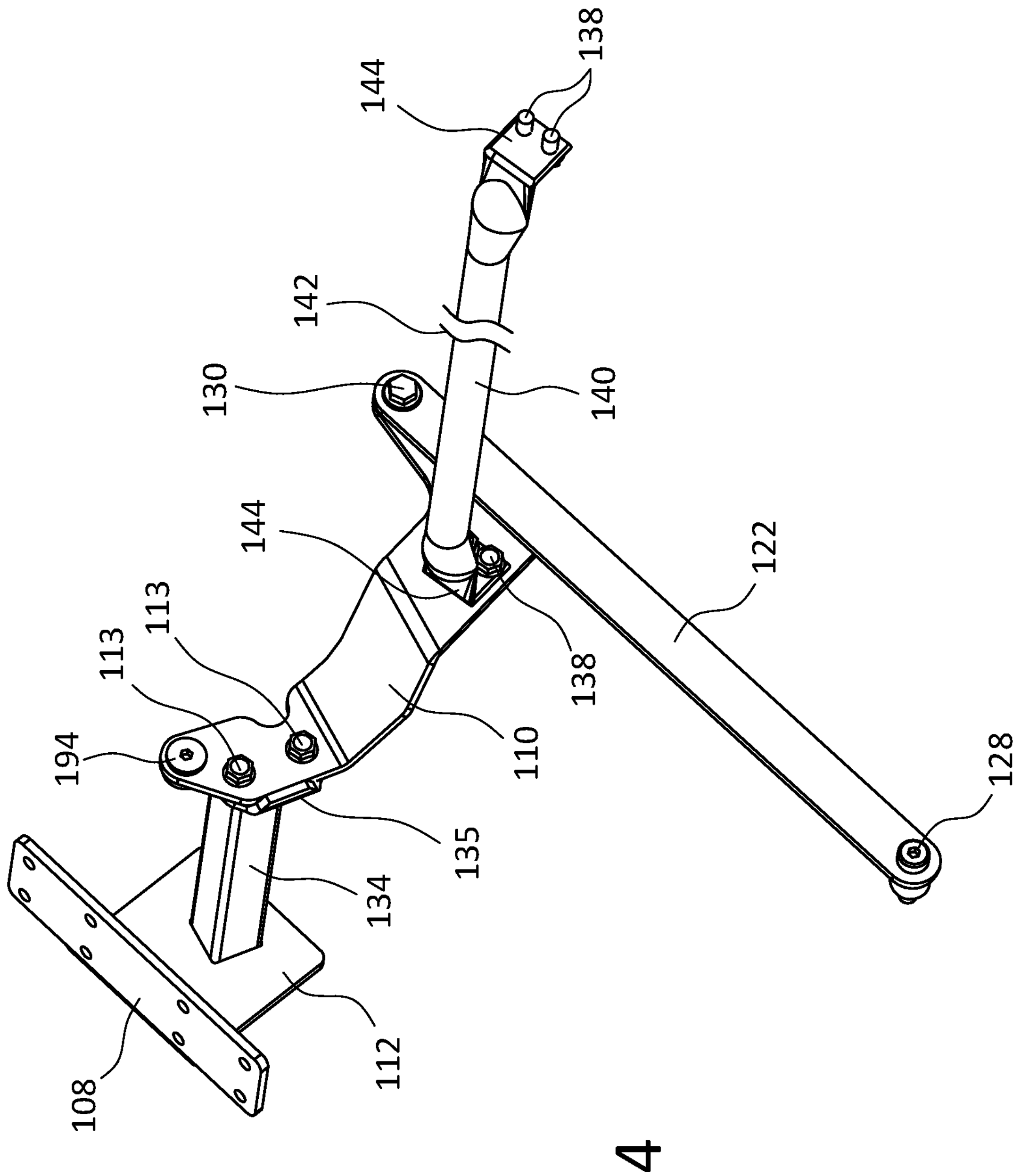
FIG. 4 is a perspective view showing one of the armrest support links as it is operatively connected at one end thereof to a transversely oriented anti-deformation link and to a straight link, as well as being operatively connected at the opposite end thereof to an armrest mounting tube upon which an armrest mounting plate is mounted.

With reference now being made to FIGS. 3 and 4, there is disclosed a more detailed view of one of the armrest support links 110, as well as the operative connection of one end of each armrest support link 110 to a transversely oriented anti-deformation tube or rod and to one of the straight links 122, as well as the operative connection of each one of the armrest support links 110, at the opposite end thereof, to an armrest mounting tube upon which each one of the armrest fixing plates 108 is mounted. More particularly, it is seen that each one of the armrest support links 110 has a substantially L-shaped configuration wherein the vertically oriented, long leg portion of the L-shaped support link 110 comprises an upper end portion within which a pair of apertures or through-bores 132,132 are defined for receiving the fasteners 113,113 for fixedly securing each one of the armrest support links 110 to a first end portion of a respective one of a pair of armrest mounting tubes 134, by means of a suitable mounting bracket 135 of each tube 134, wherein each one of the tubes 134 has a substantially square-shaped cross-sectional configuration, as can best be appreciated from FIG. 4, and wherein the opposite end of the tube 134 is fixedly or integrally connected to a respective one of the armrest mounting plates 112. Continuing still further, it is seen that the lower end portion of each one of the vertically-oriented, long leg portions of the L-shaped support links 110 is similarly provided with a pair of apertures or through-bores 136 for receiving suitable fasteners 138 which will enable opposite ends of a transversely oriented anti-deformation tube or rod 140 to be fixedly secured to the oppositely disposed armrest support links 110. The transverse or lateral extent of the anti-deformation tube or rod 140 is schematically illustrated by break lines 142, and it is seen that opposite ends of the transversely oriented anti-deformation tube or rod 140 include integral mounting brackets 144,144 by means of which the opposite ends of the transversely oriented anti-deformation tube or rod 140 can in fact be mounted upon or connected to the pair of oppositely disposed armrest support links 110. It is lastly noted, as can best be appreciated from FIG. 3, that the distal end of the short leg of each one of the L-shaped armrest support links 110 is provided with an aperture or through bore 146 through which the pivot pins 130 of the straight links 122 are to be disposed.

With reference now being made to FIGS. 5-8, the overall operating mechanism of the new and improved lift chair 100 of the present invention will now be disclosed. More particularly, a pair of linear actuator mechanisms 148,150 are provided, wherein the first linear actuator mechanism 148 is adapted to actuate or move the backrest 104 of the chair 100 between upright and reclined positions, while the second linear actuator mechanism 150 is utilized to move the lift chair 100 between the lowered position and the elevated position, as well as to move the seat of the chair between a substantially horizontal orientation and a tilted orientation at which the forward end of the seat portion of the chair is disposed at an elevation which is lower than the elevation at which the rear end of the seat portion of the chair is disposed, all as will best be appreciated from FIGS. 5, 7, and 8. More particularly, it is seen that the overall operating mechanism of the new and improved lift chair 100 comprises a transversely oriented forward cross-tube 152 which may have a substantially square-shaped cross-sectional configuration and wherein the opposite end of the transversely oriented forward cross-tube 152 are fixedly attached to lower end portions of the oppositely disposed seat base brackets 116,116. It is further seen that the motor drive 154 of the first linear actuator mechanism 148 is operatively connected to a substantially central region of the transversely oriented forward cross-tube 152 by means of a suitable clevis-type mounting bracket 156, while the oppositely disposed piston rod 158 of the first linear actuator mechanism 148 is operatively connected to a transversely oriented rear synchronization bar 160 by means of a suitable clevis-type mounting bracket 162. It is also seen that the opposite ends of the transversely oriented rear synchronization bar 160, which may have a substantially square-shaped cross-sectional configuration, are fixedly secured or mounted within lower end portions of a pair of oppositely disposed backrest link brackets 164 which are, in turn, fixedly connected to the pair of oppositely disposed backrest operating links 105,105 by means of suitable fasteners 165,165. Accordingly, it can be readily appreciated that when the first linear actuator mechanism 148 is actuated such that the piston rod 158 thereof is extended, the backrest operating links 105, 105 are caused to moved forwardly such that the backrest 104 is moved toward its upright position, whereas, conversely, when the first linear actuator mechanism 148 is actuated, such that the piston rod 158 thereof is retracted, the backrest operating links 105,105 are caused to moved rearwardly such that the backrest 104 is moved toward its inclined position.

Continuing further, and in a somewhat similar but converse manner, it is seen that the base 102 of the lift chair 100 comprises a front base member 166, a rear base member 168, a left side base member 170, and a right side base member 172. In addition, it is seen that the motor drive 174 of the second linear actuator mechanism 150 is operatively connected to the rear base member 168 by means of a suitable connector, not shown, while the oppositely disposed piston rod 176 of the second linear actuator mechanism 150 is operatively connected to a second transversely oriented forward synchronization bar 178 by means of a suitable clevis-type mounting bracket 179, all as best seen in FIG. 5. It is also seen that the opposite ends of the second transversely oriented forward synchronization bar 178, which may have a substantially square-shaped cross-sectional configuration, are fixedly secured or mounted within a pair of oppositely disposed transition brackets 180 which are, in turn, pivotally connected to the pair of oppositely disposed seat base brackets 116, 116 by means of suitable pivotal connections 182. Still yet further, as can best be appreciated from FIGS. 5, 6, and 9, the transition brackets 180 are also provided with a guide pin 184 which is adapted to protrude outwardly therefrom and be disposed within an arcuate slot 186 defined within each one of the seat base brackets 116,116. Accordingly, it can be readily appreciated that when the second linear actuator mechanism 150 is actuated such that the piston rod 176 thereof is extended, the second transversely oriented forward synchronization bar 178 will be caused to move forwardly, thereby, in turn, causing the pair of oppositely disposed transition brackets 180 to be pivotally moved in the counterclockwise direction, relative to the seat base brackets 116,116 such that the pins 184 will move forwardly within the slots 186 from the right sides of the slots 186 to the left sides of the slots 186. Upon reaching the left sides of the slots 186, the pins 184 cannot travel any further, whereby the transition brackets 180 cannot pivot any further with respect to the seat base brackets 116,116, and therefore continued extension of the piston rod 176 will cause the seat base brackets 116,116 to rotate in the counterclockwise direction whereby the lift chair 100 will be moved from the lowered position as shown in FIG. 1 to the elevated position as shown in FIG. 2.

In addition, it is to be noted, as can best be appreciated from FIG. 9, that since the seat base brackets 116 have now been fully pivoted or rotated in the counterclockwise direction, upper surface portions 188 will be tilted to an orientation whereby the seat of the lift chair 100, which is fixedly secured to the upper surface portions 188 of the seat base brackets 116, will be disposed at an inclined position at which the forward or front end of the seat will be disposed at an elevational level which is lower than or beneath the elevational level at which at rearward or back end of the seat will be disposed. At the same time, it will likewise be appreciated that since all of the movable components comprising, for example, the linear actuators 148,150, the transition members 180, and the seat base brackets 116, are separate and distinct from the armrest frameworks 106, atop which the upper surface portions 107 are provided, then despite the movement of the lift chair 100 between its lowered and elevated positions, as illustrated within FIGS. 1 and 2, the armrest frameworks 106 will always remain fixed in their overall orientation whereby the upper surface portions 107 will always be disposed in substantially horizontal planes or have substantially horizontal orientations, as illustrated within FIGS. 1 and 2. In this manner, the upper surface portions 107 can serve as stable platforms upon which a person can place their hands and be safely supported as the lift chair 100 is being moved from the lowered position of FIG. 1 to the elevated position of FIG. 2 so as to assist the person to be moved from a seated position to a standing position. It is lastly to be noted that in order to effectively define the aforenoted separate and distinct movements of the various components relative to the armrest frameworks 106, a pair of connecting plates 190,190 are respectively fixedly secured to upper rear portions of the seat link assemblies 114 by means of a plurality of fasteners 192. Finally, it is also seen that the pair of connecting plates 190,190 are pivotally connected to upper end portions of the pair of oppositely disposed armrest support links 110,110 by means of suitable pivotal connectors 194 which are disposed through suitable apertures 196 defined within the uppermost end portions of the pair of oppositely disposed armrest support links 110,110.

Having described substantially all of the components of the new and improved lift chair 100 of the present invention, the operation of the same will now be briefly described. The lift chair 100 is disclosed as being at its lowered position in FIG. 1, and at its elevated position in FIG. 2. In order to move the lift chair 100 from its lowered position of FIG. 1 to its elevated position of FIG. 2, the motor drive 174 of the linear actuator mechanism 150 is activated such that the piston rod 176 is extended. Since the distal end of the piston rod 176 is operatively connected to the transversely oriented forward synchronization bar 178, the transversely oriented forward synchronization bar 178 will be moved upwardly and forwardly which will, in turn, cause the pair of oppositely disposed transition brackets 180 to be pivotally moved in the counterclockwise direction, and relative to the seat base brackets 116,116, as a result of the pivotal connections 182, such that the pins 184 will move forwardly within the slots 186 from the right sides of the slots 186 toward the left sides of the slots 186 as can be appreciated from FIG. 9. Upon reaching the left sides of the slots 186, the pins 184 cannot travel any further, whereby the transition brackets 180 cannot pivot any further with respect to the seat base brackets 116,116, and therefore continued extension of the piston rod 176 will cause the seat base brackets 116,116, as well as the seat link assemblies 114,114 which are connected thereto, to rotate in the counterclockwise direction, as well as be moved from their lowered positions, as shown in FIG. 1, to their elevated positions as shown in FIG. 2. In addition, since the upper and lower lift links 118,120 are connected to the seat base brackets 116,116, then when the seat base brackets 116,116 are moved from their lowered positions of FIG. 1 to their elevated positions of FIG. 2, the upper and lower lift links 118,120 will likewise be moved from their lowered positions of FIG. 1 to their elevated positions of FIG. 2. Still yet further, as the seat link assemblies 114,114 and the seat base brackets 116,116 are moved from their lowered positions of FIG. 1 to their elevated positions of FIG. 2, not only will it be appreciated that the seat link assemblies 114,114, which support the seat of the chair, will now be moved from a substantially horizontal position, as disclosed within FIG. 1, to an inclined position, as disclosed within FIG. 2, whereby the seat, which is fixedly attached to the seat link assemblies 114,114, will now be inclined such that the forward end of the seat will be disposed at a lower elevation than the rear end of the seat, but, in addition, the entire lift chair 100, including the armrests 106 and their upper surface portions 107, will have been moved from the lowered position as disclosed within FIG. 1, to the elevated position as disclosed within FIG. 2, as a result of the various operative connections previously defined or described between the upper rear end portions of the seat link assemblies 114,114, the pair of connecting plates 190,190, and the armrest support links 110,110, as well as between the armrest support links 110,110 and the straight links 122, whereby the straight links 122 will effectively be pulled upwardly from their positions shown in FIG. 1 to their positions shown in FIG. 2. It can of course be readily appreciated that opposite movements of the various components will be reversed when the lift chair is moved from the elevated position as shown in FIG. 2 to the lowered position as shown in FIG. 1.

In summary, as a result of the left and right armrests of the lift chair being fixedly mounted upon the frame of the lift chair, and also being separate and apart from, for example, the seat assembly of the lift chair, then when the lift chair is moved from its lowered position to its elevated position, the left and right armrests will always remain fixed in position, within substantially horizontal planes and with respect to the frame of the chair, regardless of the movement of the chair between the lowered position and the elevated position, and regardless of the movement of the seat of the chair which is adapted to be moved, relative to the frame of the chair as well as the left and right armrests of the chair, so as to be vertically elevated along with the frame of the chair as well as to be tilted downwardly with respect to the frame of the chair and with respect to the left and right armrests of the chair such that the forward end portion of the seat is tilted downwardly while the rearward end portion of the seat is tilted upwardly. Such compound movements of the chair and the seat will assist a person to be moved from a seated position to a standing position. More particularly, as a result of the left and right armrests of the chair being fixedly mounted upon the frame of the chair, and therefore not having their dispositions or orientations altered or changed when the chair is moved or transitioned between the lowered position and the elevated position, it can be readily appreciated that even when the frame of the chair is elevated, and even when the seat of the chair is tilted in the aforenoted manner, whereby such movements of the chair and the seat will assist a person, seated within the chair, to be moved from a seated position to a standing position, the left and right armrests will always be disposed within substantially horizontal planes. In this manner, the left and right armrests will effectively enable the person, seated within the chair, to comfortably and securely grasp the left and right armrests, and to push downwardly upon such left and right armrests, whereby the fixed armrests will effectively provide the person with stable platforms upon which the person can reliably, securely, and safely place his or her hands so as to assist himself or herself to move from the seated position to the standing position.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent, is:

1. A powered lift chair for assisting a person, seated within said lift chair, to be moved from a seated position to a standing position, comprising:

a chair base;

a chair frame mounted upon said chair base;

a pair of laterally spaced armrests, defining left and right armrests, mounted upon said chair frame such that upper surface portions of said left and right armrests are disposed within substantially horizontally oriented planes;

a backrest;

a footrest;

a seat movable with respect to said left and right armrests;

a pair of oppositely disposed seat assemblies, upon which said seat is fixedly secured, pivotally connected to said pair of laterally spaced armrests whereby said pair of oppositely disposed seat assemblies can pivot with respect to said pair of laterally spaced armrests;

a linear actuator operatively connected to said chair base and to said pair of oppositely disposed seat assemblies such that as said lift chair is moved from a lowered position to an elevated position by said linear actuator, said pair of oppositely disposed seat assemblies, and said seat fixedly secured thereon, can pivot and tilt with respect to said pair of laterally spaced armrests such that said seat is moved from a substantially horizontal position to a tilted position at which a forward end portion of said seat is at a lower elevation than a rearward end portion of said seat, while said upper surface portions of said left and right armrests remain fixed within said substantially horizontally oriented planes so as to serve as stable platforms and thereby enable the person to grasp said horizontally oriented upper surface portions of said left and right armrests such that said horizontally oriented upper surface portions of said left and right armrests can securely and stably assist the person to move from the seated position to the standing position while said lift chair transitions from said lowered position to said elevated position and said seat transitions from said substantially horizontal position to said tilted position.

2. The lift chair as set forth in claim 1, wherein:

said pair of oppositely disposed seat assemblies comprises a pair of oppositely disposed seat link assemblies pivotally connected to said pair of laterally spaced armrests, and a pair of seat base brackets fixedly connected to said pair of seat link assemblies and pivotally connected to said chair base.

3. The lift chair as set forth in claim 2, wherein:

said linear actuator comprises a motor end operatively connected to said chair base, and a piston end operatively connected to said seat.

4. The lift chair as set forth in claim 3, further comprising:

a pair of transition brackets pivotally mounted respectively upon said pair of seat base brackets; and a synchronization bar having its opposite ends fixedly connected to said pair of transition brackets and operatively connected to said linear actuator such that when a piston of said linear actuator is extended, said synchronization bar will force said pair of transition brackets to pivotally move with respect to said pair of seat base brackets.

5. The lift chair as set forth in claim 4, wherein:

each one of said pair of seat base brackets is provided with an arcuately shaped slot; and each one of said pair of transition brackets has a pin extending into each one of said pair of arcuately shaped slots, whereby as said piston of said linear actuator is extended, said transition brackets will be forced to pivot, and said pins of said transition brackets will traverse said arcuately shaped slots so as to force said seat base brackets and said seat link assemblies to pivot so as to, in turn, cause said seat to be tilted downwardly such that said forward end portion of said seat is at a lower elevation than said rearward end portion of said seat.

6. The lift chair as set forth in claim 2, further comprising:

a cross-tube fixedly connecting said pair of seat base brackets together.

7. The lift chair as set forth in claim 1, wherein each one of said pair of laterally spaced armrests comprises:

an armrest fixing plate;

an armrest mounting plate fixedly connected to said armrest fixing plate; and an armrest support link fixedly attached at one end thereof to said armrest mounting plate, and pivotally attached to one of said pair of oppositely disposed seat link assemblies so as to permit said oppositely disposed seat link assemblies to pivot with respect to said pair of laterally spaced armrests when said lift chair is moved from said lowered position to said elevated position.

8. The lift chair as set forth in claim 7, further comprising:

an anti-deformation tube fixedly connecting said pair of oppositely disposed armrest support links together.

9. The lift chair as set forth in claim 7, wherein:

each one of said pair of seat base brackets is pivotally connected to said chair base by a pair of lift links; and a straight link pivotally connects one of said pair of lift links to one of said pair of armrest support links.

* * * * *